United States Patent
Fages

(10) Patent No.: US 10,968,757 B2
(45) Date of Patent: Apr. 6, 2021

(54) PROPELLER BLADE ROOT COUPLING

(71) Applicant: Ratier-Figeac SAS, Figeac (FR)

(72) Inventor: Christian Fages, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 58 days.

(21) Appl. No.: 16/362,845

(22) Filed: Mar. 25, 2019

(65) Prior Publication Data
US 2019/0309639 A1 Oct. 10, 2019

(30) Foreign Application Priority Data

Apr. 10, 2018 (EP) ..................................... 18305419

(51) Int. Cl.
| | |
|---|---|
| *F01D 5/30* | (2006.01) |
| *B64C 11/04* | (2006.01) |
| *B64C 11/16* | (2006.01) |
| *B64C 27/48* | (2006.01) |

(52) U.S. Cl.
CPC ............ *F01D 5/3023* (2013.01); *B64C 11/04* (2013.01); *B64C 11/16* (2013.01); *B64C 27/48* (2013.01)

(58) Field of Classification Search
CPC ....... F01D 5/3023; B64C 11/04; B64C 11/16; B64C 27/48
See application file for complete search history.

(56) References Cited

U.S. PATENT DOCUMENTS

| | | | | |
|---|---|---|---|---|
| 2,182,812 | A | * 12/1939 | Lougheed | .......... B29D 99/0025 |
| | | | | 416/230 |
| 2,290,607 | A | * 7/1942 | De Lavaud | ........... B64C 11/008 |
| | | | | 416/134 R |
| 2,350,345 | A | 6/1944 | Freedman et al. | |
| 2,631,680 | A | * 3/1953 | Le Compte | ............. B64C 11/04 |
| | | | | 403/225 |
| 4,260,332 | A | 4/1981 | Weingart et al. | |
| 5,319,850 | A | 6/1994 | Charbonnel et al. | |
| 6,676,080 | B2 | 1/2004 | Violette | |
| 8,753,088 | B2 | 6/2014 | Pfeiffer et al. | |
| 2003/0156944 | A1 | 8/2003 | Rust | |
| 2014/0377076 | A1* | 12/2014 | Kennedy | ............... F16B 11/002 |
| | | | | 416/226 |

FOREIGN PATENT DOCUMENTS

| | | |
|---|---|---|
| DE | 598169 C | 6/1934 |
| EP | 0610273 A1 | 8/1994 |
| GB | 2175973 A | 12/1986 |
| WO | 9308017 A1 | 4/1993 |

OTHER PUBLICATIONS

Extended European Search Report for International Application No. 18305419.6 dated Jun. 29, 2018, 7 pages.

* cited by examiner

*Primary Examiner* — Igor Kershteyn
(74) *Attorney, Agent, or Firm* — Cantor Colburn LLP

(57) ABSTRACT

A method of mounting a metal blade root to a composite propeller blade body includes inserting a connection portion of the blade body into a bore formed in the blade root, wherein the connection portion comprises at least one depression formed in an outer surface thereof, and applying pressure to the outer surface of the blade root to cause it to deform and engage with the depressions, thereby mechanically coupling the blade root to the propeller blade body.

14 Claims, 4 Drawing Sheets

PROPELLER BLADE ROOT COUPLING

FOREIGN PRIORITY

This application claims priority to European Patent Application No. 18305419.6 filed Apr. 10, 2018, the entire contents of which is incorporated herein by reference.

TECHNICAL FIELD

The present disclosure relates to a propeller blade for an aircraft, and particularly to means by which a metal blade root is mounted to a composite body of the propeller blade.

BACKGROUND

Modern propeller blades typically include a metal root 10 (sometimes referred to as a "tulip" in the industry), such as illustrated in FIG. 1.

The metal blade root 10 comprises an approximately cylindrical portion which extends into a hub arm of a hub of a propeller system, and which defines one or more bearing races 12 that rotatably secure the blade root to the hub arm via a retention bearing assembly. The other end of the metal root defines a cup 16 having a shape that is approximately conical with an oval cross-section. Often, the edge of the cup 16 may extend further along the pressure and suction surfaces than the leading and trailing edges, giving rise to a "tulip" shape.

Spar and shell propeller blades are often manufactured by first forming a carbon-foam spar 18 that is bonded to the metal root 10, then mounting leading and trailing edge foam fillers 42, 44 to the carbon-foam spar, and finally forming a shell 52 around the entire structure from a material such as glass, Kevlar®, etc., which is finally sealed using resin transfer moulding. An example of such a construction is described in EP0610273 and illustrated in FIG. 2.

The carbon-foam spar 18 is typically formed from carbon fibres 22 braided around a polyurethane foam core 20. To form the spar 18, the blade root 10 is connected to the polyurethane foam core 20, such that it fills the cupped end 16 of the blade root 10. Once connected to the blade root 10, the foam core 20 may be used as a braiding mandrel. A structural layer is formed by braiding of carbon fibres 22 over the foam core 20 and the blade root 10, which ensures good attachment of the spar 18 to the blade root 10.

Such blades are light and effective for their intended purposes. However, manufacturing the blade root 10 is expensive due to its complex shape.

SUMMARY

Viewed from a first aspect, the present disclosure provides a method of mounting an airfoil component body to a blade root, comprising: providing an airfoil component body having a connection portion, the connection portion comprising an elongate member with at least one depression formed on an outer surface thereof; inserting the connection portion into a bore formed in a metal blade root; and deforming the blade root such that a portion of the inner surface of the bore engages with at least one of the depressions in the connection portion to mechanically couple the blade root to the airfoil component body.

The connection portion may be formed at an end of the airfoil component body. The end may be a radially-inner end of the airfoil component body, i.e. the radially-inner end when mounted to a hub. The airfoil component body may comprise an airfoil body. The airfoil component body may comprise a spar body. The airfoil body or the spar body may be for a propeller blade. The at least one depression may comprise at least one groove, and may comprise at least two grooves. The or each groove may extend completely around the connection portion. The or each groove may be deeper towards a radially-inner end of the blade root than towards a radially-outer end of the blade root.

One or both of the bore and the connection portion may be shaped so as to inhibit relative rotation between the airfoil component body and the blade root. The bore may have a non-circular cross-sectional shape. In particular, a cross-sectional shape of an inner surface of the bore may be non-circular. The connection portion may have a non-circular cross-sectional shape. In particular, a cross-sectional shape of an outer surface of the connection portion may be non-circular.

The airfoil component body may comprise a body portion formed from a composite material. The connection portion may be formed from a composite material. The or each composite material may comprise a fibre-reinforced polymer material. The fibres of the fibre-reinforced polymer material may comprise at last one of glass fibres, carbon fibres, Kevlar® fibres, and mixtures thereof. The polymer of the fibre-reinforced resin material may comprise a thermoset material or a thermoplastic material. The polymer of the fibre-reinforced polymer material may comprise a resin material, and may comprise an epoxy material. A plurality of fibres may extend continuously from the body portion into the connection portion.

The at least one depression may be formed in the connection portion by removal of material, for example by milling. The at least one depression may be formed in the connection portion by moulding, for example such that the fibres of the fibre-reinforced polymer material extend continuously through the connection portion.

The method may further comprise applying an adhesive to at least one of an outer surface of the connection portion and an inner surface of the bore. The adhesive may be applied before inserting the connection portion into the bore formed in a metal blade root.

The method may further comprise fitting one or more brace members within a bore of the connection portion prior to deforming the blade root.

The blade root may be deformed by applying pressure to a portion of an outer surface of the blade root. The pressure may be applied by one of a mechanical system, a hydraulic system, an electro-hydraulic system and a magnetic-pulse system.

The blade root may be configured to engage a propeller hub. The blade root may define at least one bearing race. The bearing race may be formed integrally with a body of the blade root. The bearing race may be oriented to prevent radially-outward movement of the blade root. The blade root may define at least one retention mechanism to prevent radially-inward movement of the blade root.

Viewed from a second aspect, the present disclosure provides an airfoil component comprising: an airfoil component body defining an elongate member with at least one depression formed on an outer surface thereof; and a metal blade root defining a bore, wherein the connection portion is received within the bore, and wherein an outer surface of the blade root has been deformed such that a portion of the inner surface of the bore engages with at least one of the depressions in the connection portion to mechanically couple the blade root to the body.

The airfoil component may comprise an airfoil body. The airfoil component may comprises a spar body. The airfoil component may be for a propeller blade.

The at least one depression may comprise at least one groove, and may comprise at least two grooves. The or each groove may extend completely around the connection portion. The or each groove may be deeper towards a radially-inner end of the blade root.

One or both of the bore and the connection portion may be shaped so as to inhibit relative rotation between the airfoil component body and the blade root. The bore may have a non-circular cross-sectional shape. In particular, a cross-sectional shape of an inner surface of the bore may be non-circular. The connection portion may have a non-circular cross-sectional shape. In particular, a cross-sectional shape of an outer surface of the connection portion may be non-circular.

The airfoil component body may comprise a body portion formed from a composite material. The connection portion may be formed from a composite material. The composite material(s) may comprise a fibre-reinforced polymer material. The fibres may comprise at last one of glass fibres, carbon fibres, Kevlar® fibres, and mixtures thereof. The polymer of the fibre-reinforced resin material may comprise a thermoset material or a thermoplastic material. The polymer may comprise a resin material, and may comprise an epoxy material. A plurality of fibres may extend continuously from the body portion into the connection portion.

The airfoil component may comprise an adhesive bonding an outer surface of the connection portion to an inner surface of the bore.

The blade root may be configured to engage a propeller hub. The blade root may define at least one bearing race. The bearing race may be formed integrally with a body of the blade root. The bearing race may be oriented to prevent radially-outward movement of the blade root. The blade may root define at least one retention mechanism to prevent radially-inward movement of the blade root.

Viewed from a third aspect, the present disclosure provides an propeller blade comprising: a blade body including a blade portion and an elongate connection member, the blade portion and the enlongate connection member being integrally formed from a fibre-reinforced polymer material, wherein the elongate connection member includes at least one depression formed on an outer surface thereof; and a metal blade root defining an internal bore and at least one bearing race on an outer surface thereof, wherein the connection portion is received within the bore, and wherein an outer surface of the blade root has been deformed such that a portion of the inner surface of the bore engages with at least one of the depressions in the connection portion to mechanically couple the blade root to the blade body.

A propeller may comprise a propeller hub and at least two propeller blades as described above mounted to the propeller hub.

BRIEF DESCRIPTION OF THE DRAWINGS

Certain embodiments of the present disclosure will now be discussed in greater detail by way of example only and with reference to the following drawings, in which.

DETAILED DESCRIPTION

Figure 1:
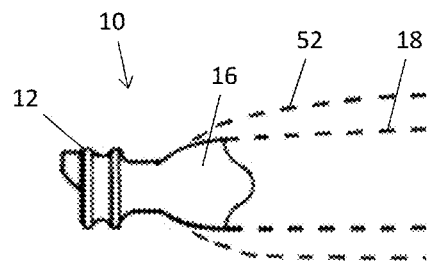
FIG. 1 shows a prior art blade root.
Figure 2:
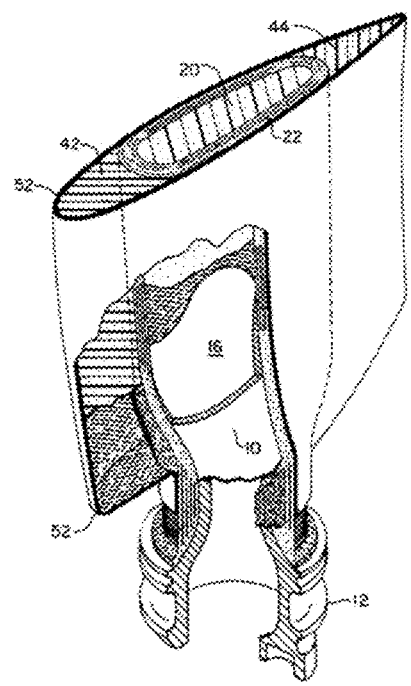
FIG. 2 shows a cut-away view of the root portion of a prior art propeller blade.
Figure 3:
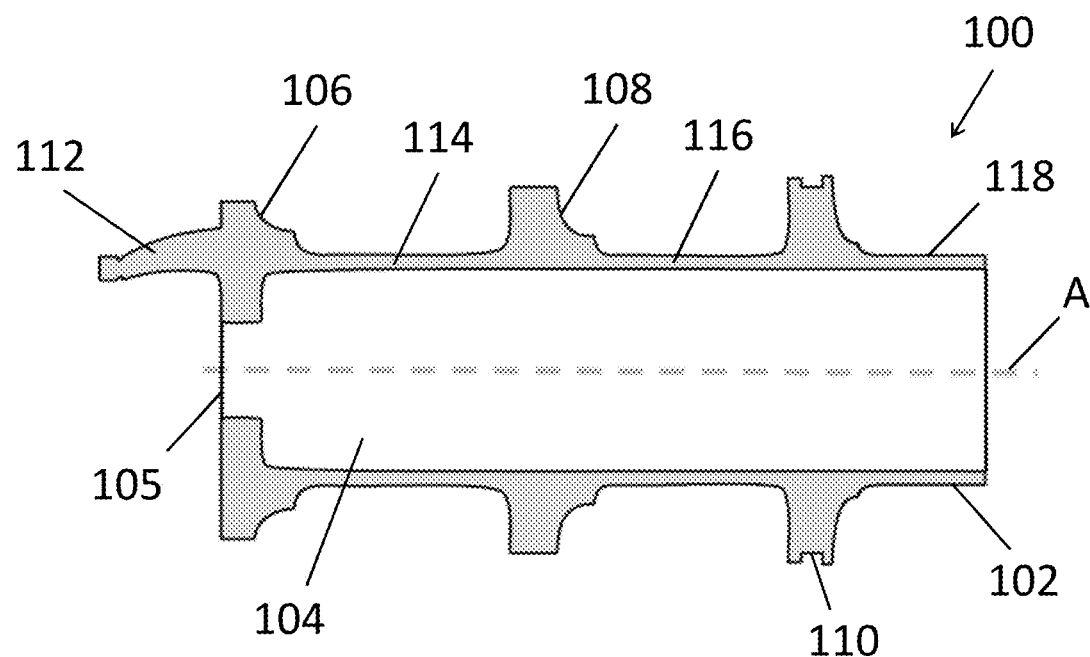
FIG. 3 shows a blade root in accordance with the present disclosure.

FIG. 3 illustrates a blade root 100 in accordance with the present disclosure. The blade root 100 may be formed from a metal material, such as steel, aluminium, titanium or similar metal.

The blade root 100 may comprise a root body 102. The root body 102 may be approximately tubular. The root body 102 may define a bore 104. The bore 104 may extend in an approximately axial direction of the blade root 100, for example along a rotation axis A of the blade root 100. The bore 104 may comprise a circular cross-section or the bore 104 may comprise a non-circular cross-section, for example to inhibit relative rotation between the root 100 and a member 122 received within the bore 104.

The bore 104 may be open at a radially-outer end of the root body 102 (right-hand side in the Figures). The bore 104 may comprise parallel/straight internal surfaces or tapered internal surfaces, which may narrow towards a radially-inner end of the root body 102 (left-hand side in the Figures). Thus, a member 122 may be inserted from the radially-outer end of the bore 104. The bore 104 may be a blind bore or may be a through-hole. The bore 104 may comprise an opening 105 formed at a radially-inner end of the blade root 100.

The blade root 100 may comprise at least a first bearing race 106. The blade root 100 may further comprise a second bearing race 108. The or each bearing race 106, 108 may be oriented to oppose a force in the radially-outward direction on the blade root 100. The or each bearing race 106, 108 may be formed on the root body 102, for example on an outer surface thereof, and may be formed integrally with the root body 102. The or each bearing race 106, 108 may have been machined from the root body 102. The or each bearing race 106, 108 may be configured to permit rotation of the blade root 100 around a rotation axis A of the blade root 100, for example when the blade root 100 is mounted to a blade hub of an aircraft (not shown). The or each bearing race 106, 108 may be substantially circular.

The blade root 100 may comprise a retention structure 110. The retention structure 110 may comprise a groove, which may be configured to receive a retention clip. The retention structure 110 may be formed along the blade root 100 radially outwardly of at least the first bearing race 106. The retention structure may be configured to prevent radially-inward movement of the blade root 100, for example when the blade root 100 is engaged with a blade hub. The retention structure 110 may be formed on the root body 102, for example on an outer surface thereof, and may be formed integrally with the root body 102. The retention structure 110 may have been machined from the root body 102. Retention structure 110 may be configured to permit rotation of the blade root 100 around a rotation axis A thereof, for example when mounted to a blade hub of an aircraft. For example, the retention structure 110 may be substantially circular.

The blade root 100 may comprise a boss 112. The boss 112 may be formed on the root body 102, and may particularly be formed extending from a radially-inner end of the root body 102. The boss 112 may be configured to engage a pitch control mechanism within a blade hub. The boss 112 may permit rotation of the blade root 100 about an axis A thereof.

The root body 102 may comprise one or more deformable regions 114, 116, 118. The or each deformable region 114, 116, 118 may comprise a relatively thin region of the root body 102. A deformable region 114 may be located between two bearing races 106, 108. A deformable region 116 may be located between a bearing race 108 and a retention structure 110. A deformable region 118 may be located radially-outward of a retention structure 110.

Figure 4:
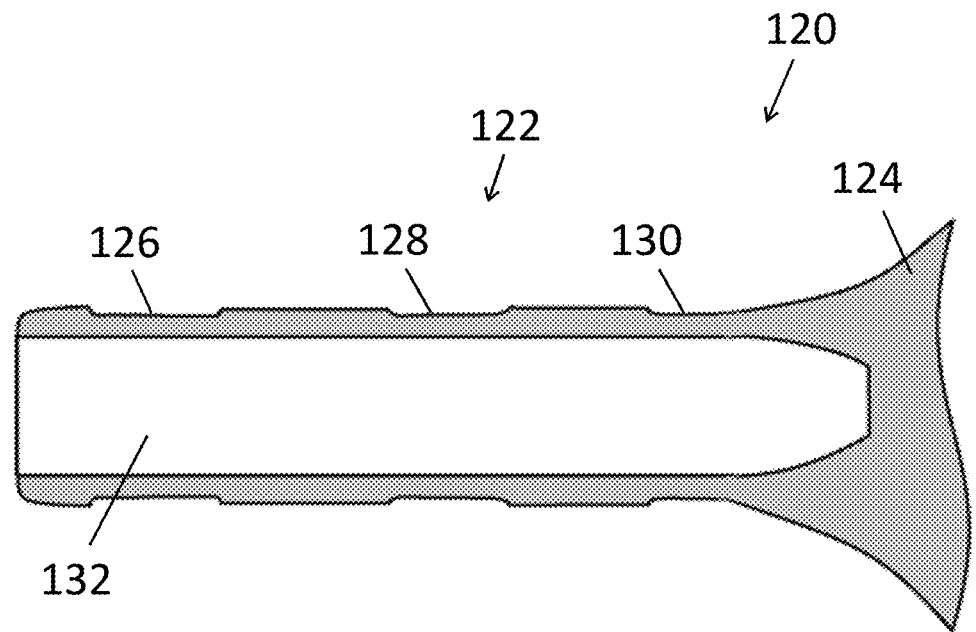
FIG. 4 shows a connection portion of a spar configured to engage the blade root.

FIG. 4 illustrates a radially-inner end of a spar 120. The spar 120 may be a spar 120 for a shell-and-spar construction blade, which may be a propeller blade for an aircraft.

The spar 120 comprises a connection member 122 formed at a radially inner end of the spar 120. The connection member 122 may comprise an elongate member. The connection member 122 may be sized to be received within the bore 104 of the blade root 100. An outer surface of the connection member 122 may be circular in cross-section or may be non-circular in cross-section, for example to inhibit relative rotation between the member 122 and the blade root 100.

The spar 120 may comprise a spar body 124. The spar body 124 may have any suitable construction. For example, the spar body 124 may comprise a spar shell (not shown), which may be formed from a composite material. The composite material may be a fibre-reinforced polymer material. The fibres may comprise any suitable material, such as glass fibres, carbon fibres, Kevlar® fibres, organic fibres, or combinations thereof. The polymer material may comprise any suitable material, such as epoxy resin. The polymer material may be a thermoset material or a thermoplastic material. The spar shell may surround a core (not shown). The core may comprise a foam material, such as a polymeric foam material, for example polyurethane foam. The spar shell may have been formed by braiding, for example around a core. The spar shell may have been formed by laying sheets of material in a mould. The sheets of material may comprise composite prepreg sheets or may comprise dry fibre sheets. The spar shell may have been formed using a resin moulding process, such as resin transfer moulding.

The connection member 122 may have been formed integrally with the spar body 124. The connection member 122 may be formed from the same material as the spar body, which may be the composite material described above. Fibres may extend continuously through the spar body 124 and through the connection member 122.

The connection member 122 may comprise one or more depressions 126, 128, 130 formed in an outer surface thereof. The or each depression 126, 128, 130 may comprise a groove extending around a circumference of the connection member 122. The or each depression 126, 128, 130 may have been formed by removing material, such as by milling or lathing. Alternatively, the or each depression 126, 128, 130 may have been formed by moulding, for example when forming the spar body 124. This may be advantageous for a fibre-reinforced composite material as the fibres may not then be interrupted.

The depressions 126, 128, 130 may have been formed by providing local reinforcement at locations between the depressions 126, 128, 130. The local reinforcement may cause local thickening, which may result in the formation of the depressions 126, 128, 130 between the thickened portions. The local reinforcement may be provided on an inner surface of the connection member 122. The local reinforcement on an inner surface of the connection member 122 may cause an external surface of the connection member 122 to undulate. Thus, for a fibre-reinforced composite material the fibres along the outer surface of the connection member 122 may not then be interrupted.

The connection member 122 may comprise an inner bore 132. The inner bore 132 may extend in a substantially axial direction, for example along an axis A of rotation of the blade root 100. The bore 132 may have a substantially cylindrical internal surface, i.e. having straight/parallel internal surfaces. The inner bore 132 may be a blind bore. The inner bore 132 may be open at a radially inner end of the spar 120.

Figure 5:
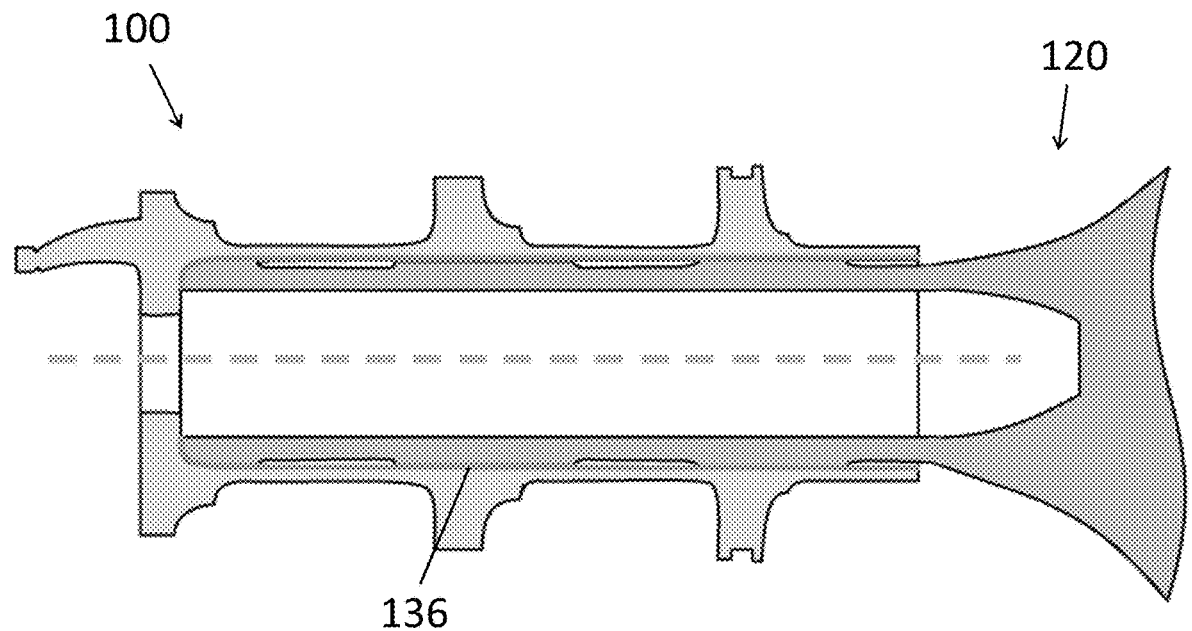
FIG. 5 shows the connection portion received within the blade root.
Figure 6:
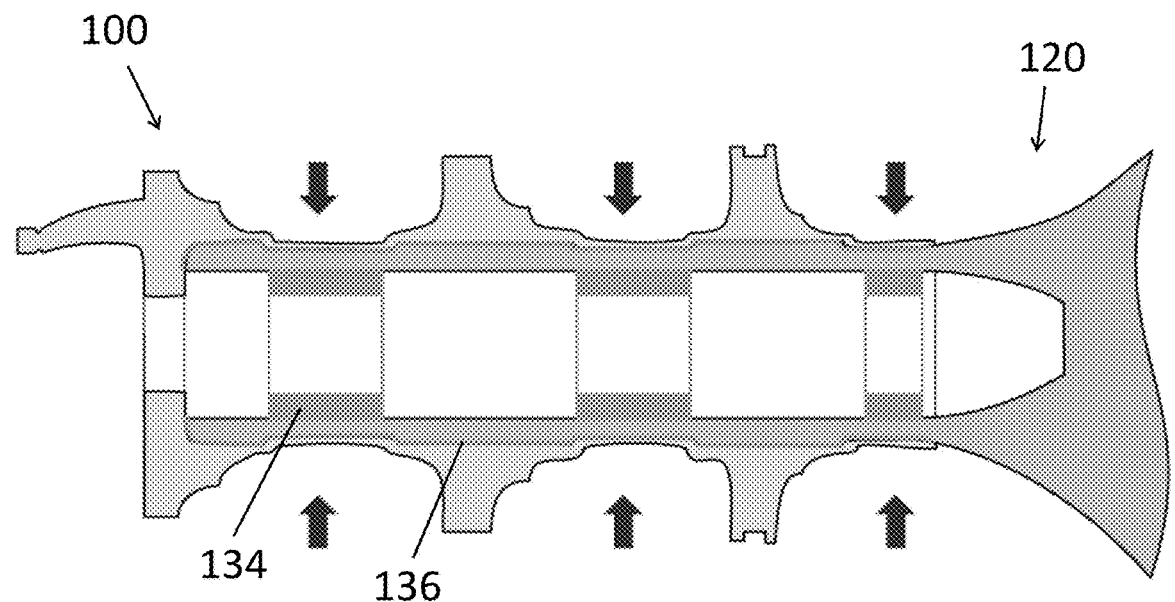
FIG. 6 shows the application of pressure to deform the blade root.

FIGS. 5 and 6 show a method of mechanically coupling the connection member 122 of the spar 120 to the blade root 100. The coupling may take place after the composite material of the spar 120 has been cured.

To mechanically couple the blade root 100 and the spar 120, the connection portion 122 of the spar 120 may be inserted into the bore 104 of the blade root 100. The material of one or more deformable regions 114, 116, 118 of the blade root 100 may then be permanently deformed so as to engage with the one or more depressions 126, 128, 130 of the spar 120. To deform the one or more deformable regions 114, 116, 118, a pressure may be applied to the one or more deformable regions 114, 116, 118 of the blade root 100. The pressure may cause a material of the blade root 100 to yield and deform in a plastic manner. The one or more deformable regions 114, 116, 118 may deform so as to conform to a shape of a respective depression 126, 128, 130.

A pressure may be applied to the one or more deformable regions 114, 116, 118 by any suitable means. For example, the pressure may be applied by a mechanical system, a hydraulic system, an electro-hydraulic system or a magnetic-pulse system. Deforming the deformable region 114, 116, 118 using a magnetic-pulse system is particularly advantageous, as this technique is both fast and precise. Another advantageous technique may involve using compression wraps to deform the deformable regions 114, 116, 118.

Optionally, an adhesive 136 may be applied to one or both of an inner surface of the bore 104 of the blade root 100 and an outer surface of the connection member 122. Any suitable adhesive may be used that is capable of bonding the respective materials of the blade root 100 and the spar 120. For example, the adhesive may comprise an epoxy resin.

Optionally, one or more brace members 134 may be provided within a bore 132 of the connection member 122. The or each brace member 134 may be aligned with a deformable region 114, 116, 118 and/or depression 126, 128, 130. The or each brace member 134 may be permanently fixed within the structure. For example, they may be bonded within the spar 120 during manufacture and/or by the mechanical coupling of the blade root 100. Alternatively, they may be removable after the mechanical coupling of the blade root 100, for example via opening 105.

The brace members 134 in FIG. 5 are rigid annular members. However, alternative mechanisms may be used. For example, a hydraulic bladder could be inflated within the bore 132.

Once the deformable regions 114, 116, 118 are deformed and engaged with the depressions 126, 128, 130, the blade root 100 will be mechanically coupled to the spar 120. This advantageously allows for a simpler design of the blade 100. This reduces cost as well as weight. Furthermore, the use of a mechanical connection reduces problems such as composite material bonding to an outer surface of the blade root 100 that must be machined off, as can occur when the spar 120 is formed integrally with the blade root 100.

Figure 7:
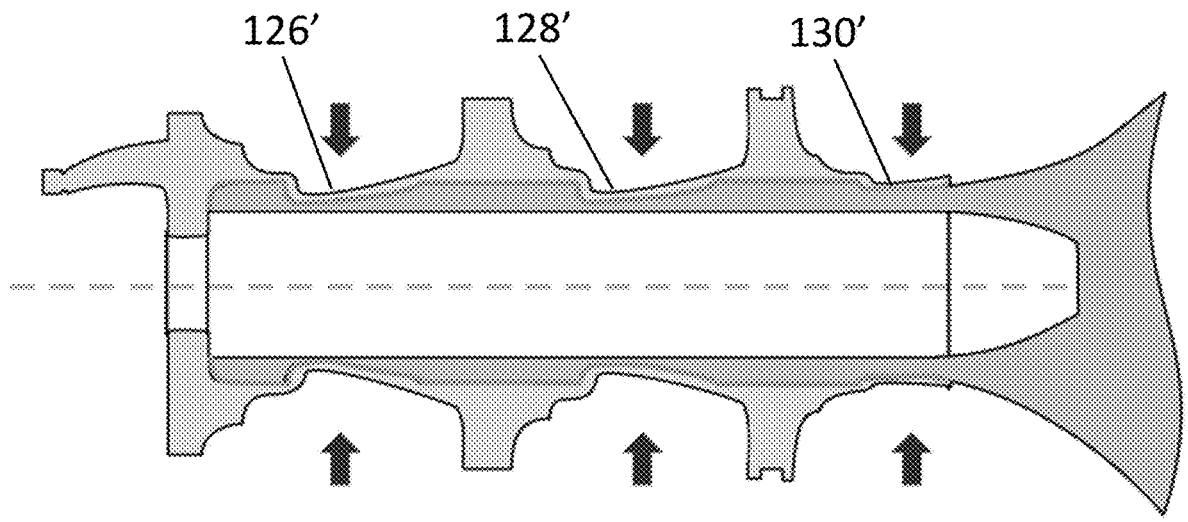
FIG. 7 shows an alternative design for the connection portion.

The arrangement shown in FIGS. 3 to 6 uses flat depressions 126, 128, 130 in the connection member 122. However, the disclosure is not limited to such a configuration. For example, with reference to FIG. 7, one or more depressions 126', 128', 130' may be formed with an axial slope. For example, a radially-inner region of a depression 126', 128', 130' may be deeper than a radially-outer region of the depression 126', 128', 130'. This may be particularly advantageous as the loading experienced by the mechanical coupling will pull the spar 100 in a radially-outwards direction. The configuration shown in FIG. 7 provides greater resistance against a withdrawing force in this direction.

Whilst the above described embodiment has been illustrated attaching a spar 120 to a blade root 100, it will be appreciated that it may likewise be employed for attaching any airfoil component to the blade root 100. For example, instead of attaching the blade root 100 to the spar and then forming the blade, the blade may be formed about the spar 120 and then the entire blade may be coupled to the blade root 100 using the technique described above.

The invention claimed is:

1. A method of mounting an airfoil component body to a blade root, comprising:
   providing the airfoil component body, the airfoil component body having a connection portion, the connection portion comprising an elongate member with at least one depression formed on an outer surface thereof, wherein the airfoil component body is formed from a fibre-reinforced polymer material;
   inserting the connection portion into a bore formed in the blade root, the blade root being a metal blade root; and
   deforming the blade root such that a portion of the inner surface of the bore engages with at least one of the depressions in the connection portion to mechanically couple the blade root to the airfoil component body.

2. The method according to claim 1, wherein the at least one depression comprises a groove.

3. The method according to claim 1, wherein the bore and the connection portion each have a non-circular cross-sectional shape.

4. The method according to claim 1, wherein a plurality of fibres extend continuously from a body portion of the airfoil component body into the connection portion.

5. The method according to claim 1, further comprising:
   applying an adhesive to at least one of an outer surface of the connection portion and an inner surface of the bore before deforming the blade root, and curing the adhesive after deforming the blade root.

6. The method according to claim 1, further comprising:
   fitting one or more brace members within a bore of the connection portion prior to deforming the blade root.

7. The method according to claim 1, wherein the blade root is deformed by a magnetic-pulse system.

8. The method according to claim 1, wherein the airfoil component body comprises a propeller blade body or a spar body for a propeller blade.

9. An airfoil component comprising:
   an airfoil component body having a connection portion, the connection portion comprising an elongate member with at least one depression formed on an outer surface thereof, wherein the airfoil component body is formed from a fibre-reinforced polymer material; and
   a metal blade root defining a bore;
   wherein:
   the connection portion is received within the bore; and
   an outer surface of the blade root is deformed such that a portion of the inner surface of the bore engages with at least one of the depressions in the connection portion to mechanically couple the blade root to the airfoil component body.

10. The airfoil component according to claim 9, wherein the at least one depression comprises a groove.

11. The airfoil component according to claim 9, wherein the bore and the connection portion each have a non-circular cross-sectional shape.

12. The airfoil component according to claim 9, wherein:
    a plurality of the reinforcement fibres extend continuously through both the connection portion and a body portion of the airfoil component body.

13. The airfoil component according to claim 9, further comprising:
    an adhesive bonding an outer surface of the connection portion to an inner surface of the bore.

14. A propeller comprising a propeller hub and at least two propeller blades, wherein each of the propeller blades is an airfoil component comprising:
    an airfoil component body having a connection portion, the connection portion comprising an elongate member with at least one depression formed on an outer surface thereof, wherein the airfoil component body is formed from a fibre-reinforced polymer material; and
    a metal blade root defining a bore;
    wherein:
    the connection portion is received within the bore; and
    an outer surface of the blade root is deformed such that a portion of the inner surface of the bore engages with at least one of the depressions in the connection portion to mechanically couple the blade root to the airfoil component body.

* * * * *